United States Patent
Earl et al.

(10) Patent No.: US 6,456,383 B1
(45) Date of Patent: *Sep. 24, 2002

(54) METHOD AND APPARATUS FOR MAKING ABSOLUTE RANGE MEASUREMENTS

(75) Inventors: Dennis D. Earl, Knoxville, TN (US); Stephen W. Allison, Knoxville, TN (US); Michael R. Cates, Oak Ridge, TN (US); Alvin J. Sanders, Knoxville, TN (US)

(73) Assignees: UT Battelle, LLC, Oak Ridge, TN (US); The University of Tennessee Research Corporation, Knoxville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/705,847

(22) Filed: Nov. 3, 2000

Related U.S. Application Data (63) Continuation of application No. 09/314,859, filed on May 19, 1999, now abandoned, which is a continuation of application No. 09/018,502, filed on Feb. 4, 1998, now Pat. No. 5,914,785.

(51) Int. Cl.[7] ............................................. G01D 11/14
(52) U.S. Cl. ....................................... 356/614; 356/498
(58) Field of Search .................................. 356/614, 498

(56) References Cited

U.S. PATENT DOCUMENTS

| | | | | | |
|---|---|---|---|---|---|
| 3,937,580 | A | * | 2/1976 | Kasdan ....................... | 356/635 |
| 4,498,775 | A | * | 2/1985 | White ......................... | 356/614 |
| 5,592,285 | A | * | 1/1997 | Pund .......................... | 356/622 |
| 5,914,785 | A | * | 6/1999 | Allison et al. ............... | 356/614 |

* cited by examiner

Primary Examiner—Richard A. Rosenberger
(74) Attorney, Agent, or Firm—Duane Morris LLP (57) ABSTRACT

This invention relates to a method and apparatus for making absolute distance or ranging measurements using Fresnel diffraction. The invention employs a source of electromagnetic radiation having a known wavelength or wavelength distribution, which sends a beam of electromagnetic radiation through a screen at least partially opaque at the wavelength. The screen has an aperture sized so as to produce a Fresnel diffraction pattern. A portion of the beam travels through the aperture to a detector spaced some distance from the screen. The detector detects the central intensity of the beam as well as a set of intensities displaced from a center of the aperture. The distance from the source to the target can then be calculated based upon the known wavelength, aperture radius, and beam intensity.

5 Claims, 8 Drawing Sheets

METHOD AND APPARATUS FOR MAKING ABSOLUTE RANGE MEASUREMENTS

This application is a continuation application of application Ser. No. 09/314,859 filed May 19, 1999, now abandoned which is a continuation of application Ser. No. 09/018,502, filed Feb. 4, 1998, now U.S. Pat. No. 5,914,785.

This invention was made with support by the United States Government under contract DE-AC05-00OR22725 awarded by the U.S. Department of Energy to UT-Battelle, LLC and the Government has certain rights in this invention.

BACKGROUND OF THE INVENTION

1. Field of the Invention

This invention relates to a method and apparatus for making absolute distance or ranging measurements using Fresnel diffraction. The invention employs a source of electromagnetic radiation ("light source") having a known wavelength or wavelength distribution, which sends a beam of electromagnetic radiation to a target, then through a screen having an aperture, and then onto a target observation point. The aperture is sized so as to produce a Fresnel diffraction pattern. A portion of the beam travels through the aperture to a detector, which may be spaced a known or an unknown known distance from the screen, depending on embodiment. The detector detects the central intensity of the beam and intensities at other points, depending on embodiment. The distance from the object which causes the beam to be split to the target can then be calculated based upon the known wavelength, aperture radius, beam intensity, and distance from the detector to the screen. In an alternative embodiment, the distance between target and detector can be calculated based upon the known wavelength, aperture radius, beam intensity, and distance from the detector to the screen.

2. Description of the Prior Art

Prior art interferometers are unable to measure absolute distances, are costly. Interferometers are limited to relative distance measurements, rather than absolute distance measurements. Interferometers usually require a specularly reflective target surface from which light is reflected to form an interference pattern.

Other prior art methods of making distance measurements include triangularization and digital detection. Such methods have a limited range in which micron accuracy is available. This limited range is normally less than five millimeters. Such devices also have a limited accuracy, on the order of greater than one micron for ranges in excess of five millimeters. Such devices further require frequent calibration.

The present invention provides a method and apparatus for measuring absolute distances over long ranges with high precision. The present invention can be operated in either a continuous or pulsed mode, requires minimal optical alignment, provides rapid data acquisition and is capable of making measurements over a wide variety of target surface qualities including very diffuse and highly reflective surfaces.

The present invention provides extremely high accuracy in measuring absolute distances. The present invention is capable of making absolute distance measurements on the order of magnitude of a meter, with an accuracy on the order of magnitude of an 0.1 micrometers.

DESCRIPTION OF THE PREFERRED EMBODIMENTS

Figure 1:
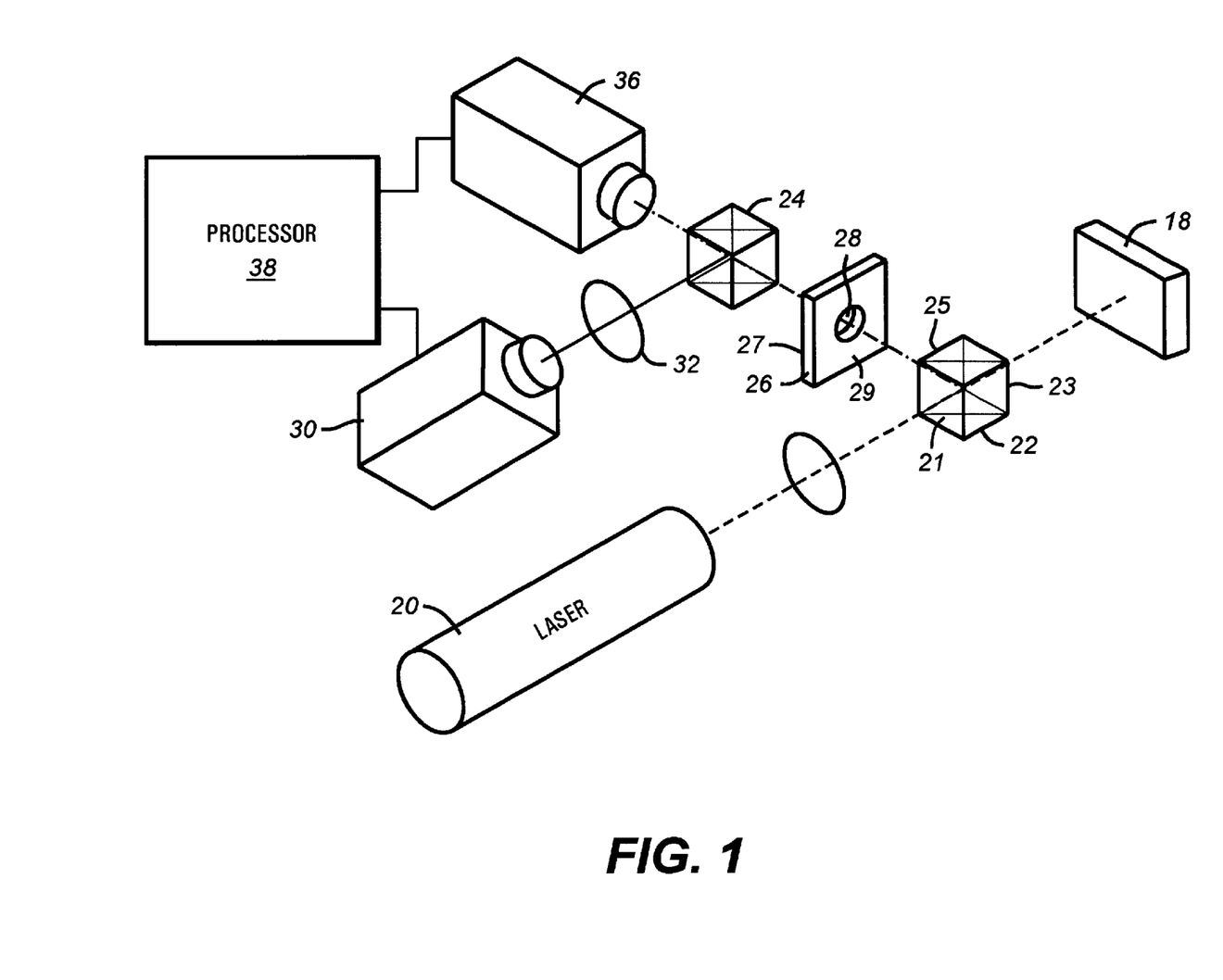
FIG. 1 is an isometric view of a first embodiment of the present invention.

A first embodiment of the present invention is depicted in FIG. 1. This embodiment is a system for making absolute distance measurements between a point and a target comprising a laser light source 20 aimed at a target 18. The laser light source is capable of producing light having a known wavelength. In a preferred embodiment, the laser light source is capable of producing polarized light.

A first beamsplitter 22 is position between the laser light source and the target at a know distance A, from the target. The beamsplitter comprises a first side 21 facing the laser light source, a second side 23 facing the target, and a third side 25 facing away from the laser light source and the target.

A screen 26 comprising an aperture or pinhole 28 with a radius R, a backside 27, and a front side 29, facing the third side of the first beamsplitter. The screen is positioned at a known distance, B, from the beamsplitter. In a preferred embodiment, the radius, R, is within a range of 1 to 4 millimeters. The desired size of the aperture is a function of the wavelength of the light or other electromagnetic radiation used in practicing the invention, as well as other dimensions, including A and B.

A second beamsplitter 24 is positioned a distance, C, from the screen to face the back side of the screen as depicted in FIG. 1. The second beamsplitter is capable of emitting a multiplicity of beams when light is emitted through the aperture to the second beamsplitter.

A first detector is spaced apart from the second beamsplitter by a first optical path distance, D1. The first detector is positioned to receive a beam of laser light emitted from the second beamsplitter. The first detector is capable of measuring the first central intensity, CI1, of the beam.

A second detector is spaced apart from the second beamsplitter by a second optical path distance, D2, which is not equal to the first optical path distance. The second detector is positioned to receive a beam of laser light emitted from the second beamsplitter. The second we detector is capable of measuring the second central intensity, CI2, of the beam.

The first embodiment of the present invention further comprises a processor 38 coupled to receive signals indicative of measured intensity, CI1 and CI2, from the first and second detectors. The processor comprises algorithms from which preselected distances can be calculated. Such algorithms may include equation (1), disclosed above.

In a preferred embodiment, the invention further comprises a piece of transparent material 32 between the screen and either the first detector or the second detector. The transparent material is capable of altering the optical path length between the screen and the detector in front of which the material is placed. The transparent material may have a variable index of refraction. Thus, it is possible for the first detector and the second detector to be equally spaced from the screen, in terms of absolute distance, but unequally spaced from the screen, in terms of optical distance, resulting from the use of the transparent material.

Figure 2:
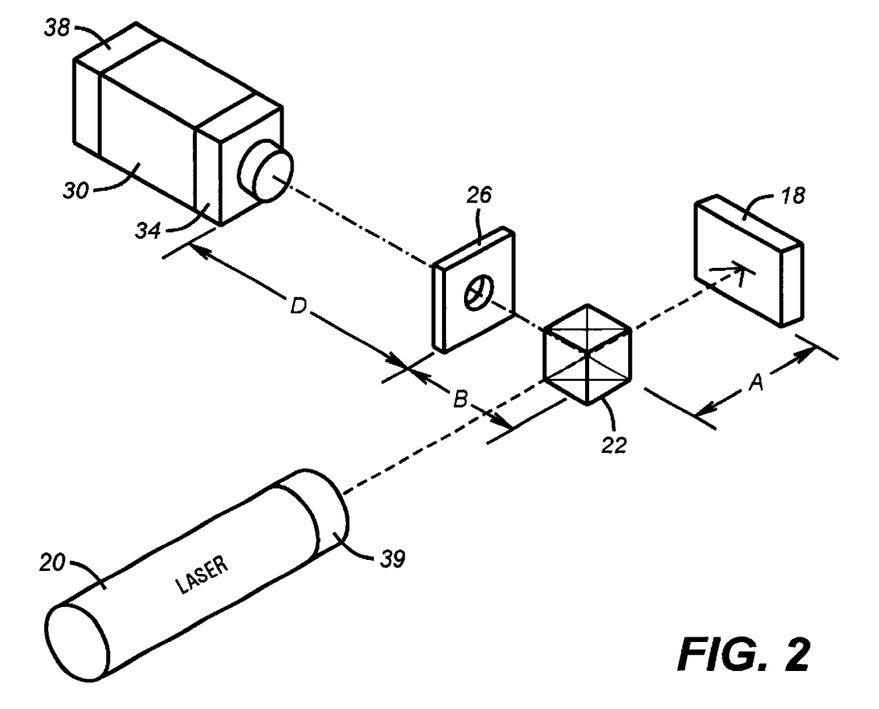
FIG. 2 is an isometric view of a second embodiment of the present invention.

A second embodiment of the present invention is depicted in FIG. 2. This embodiment is a system for making absolute distance measurements between a point and a target comprising a laser light source aimed at a target. The laser light source 20 is capable of producing light having a known wavelength. In a preferred embodiment, the laser light source is capable of selectively emitting laser light of at least two different wavelengths. In another preferred embodiment, the detector comprises a tunable filter 39 capable of filtering the wavelengths of light detected by the detector.

A beamsplitter is positioned between the laser light source and the target at a known distance, A, from the target. The beamsplitter comprises a first side facing the laser light source, a second side facing the target, and a third side facing away from the laser light source and the target.

A screen comprising an aperture or pinhole having known dimensions, a backside, and a front side facing the third side of the beamsplitter, is positioned at a known distance, B, from the beamsplitter. In a preferred embodiment, the aperture has a known radius, R. In another preferred embodiment of this invention, the pinhole does not have to be circular or constant in diameter. A variable size pinhole can be used to resolve distance ambiguities and to increase the accuracy and range of the present invention. Variation of the pinhole size, referred to herein as "aperture modulation" allows for the tuning of the sensitivity of the present invention for a particular distance.

When the only unknown in Equation 1 is R, this embodiment of the invention can be used to solve for R. Where physical properties of the screen, such as the coefficient of thermal expansion, are known, variations in R can be correlated to temperature changes. Thus, this embodiment of the present invention can be used to measure temperature changes or heat transfer where the diffraction pattern is changing as a function of changes in aperture size.

A detector is positioned a known distance, D, from the screen, on the backside of the screen, and in alignment with the screen and the beamsplitter so as to receive a beam of laser light emitted from the laser source and to measure the central intensity, CI, of the beam. In a preferred embodiment, the detector is a charged coupled device detector, hereinafter referred to as a "CCD camera".

This embodiment of the invention further comprises a processor coupled to receive signals indicative of measured central intensity, CI, from the detector. The processor comprises algorithms from which distances can be calculated.

Figure 9:
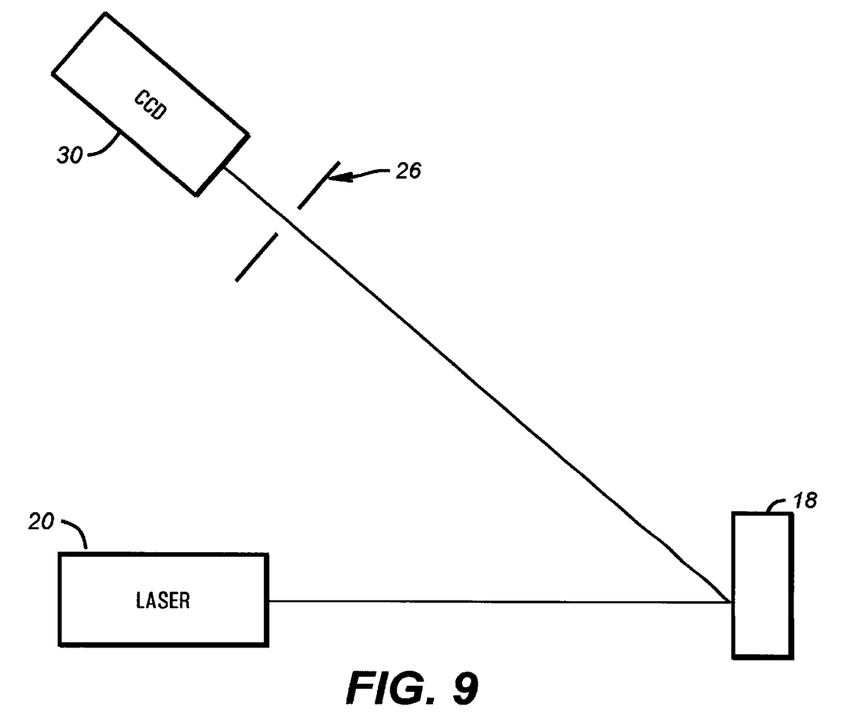
FIG. 9 is a top view of a sixth embodiment of the present invention.

An embodiment of the invention which does not comprise a separate beamsplitter is depicted in FIG. 9. This embodiment comprises a laser light source 20 aimed at a target. The laser light source is capable of producing light having a known wavelength. In a preferred embodiment, the laser light source is capable of producing polarized light. The invention further comprises a screen 26 comprising an aperture having known dimensions, a back side, and a front side facing a target. The screen is positioned at known distance, A+B, from a target.

The invention further comprises a detector 30 positioned a known distance, D, from the screen, on the back side of the screen. The detector is positioned to receive laser light that is emitted from the light source and scattered from a target. The detector is positioned to measure the intensity, CI, of the beam.

The invention further comprises a processor coupled to receive signals indicative of measured intensity, CI, from the detector. The processor comprises algorithms from which distances can be calculated.

Figure 10:
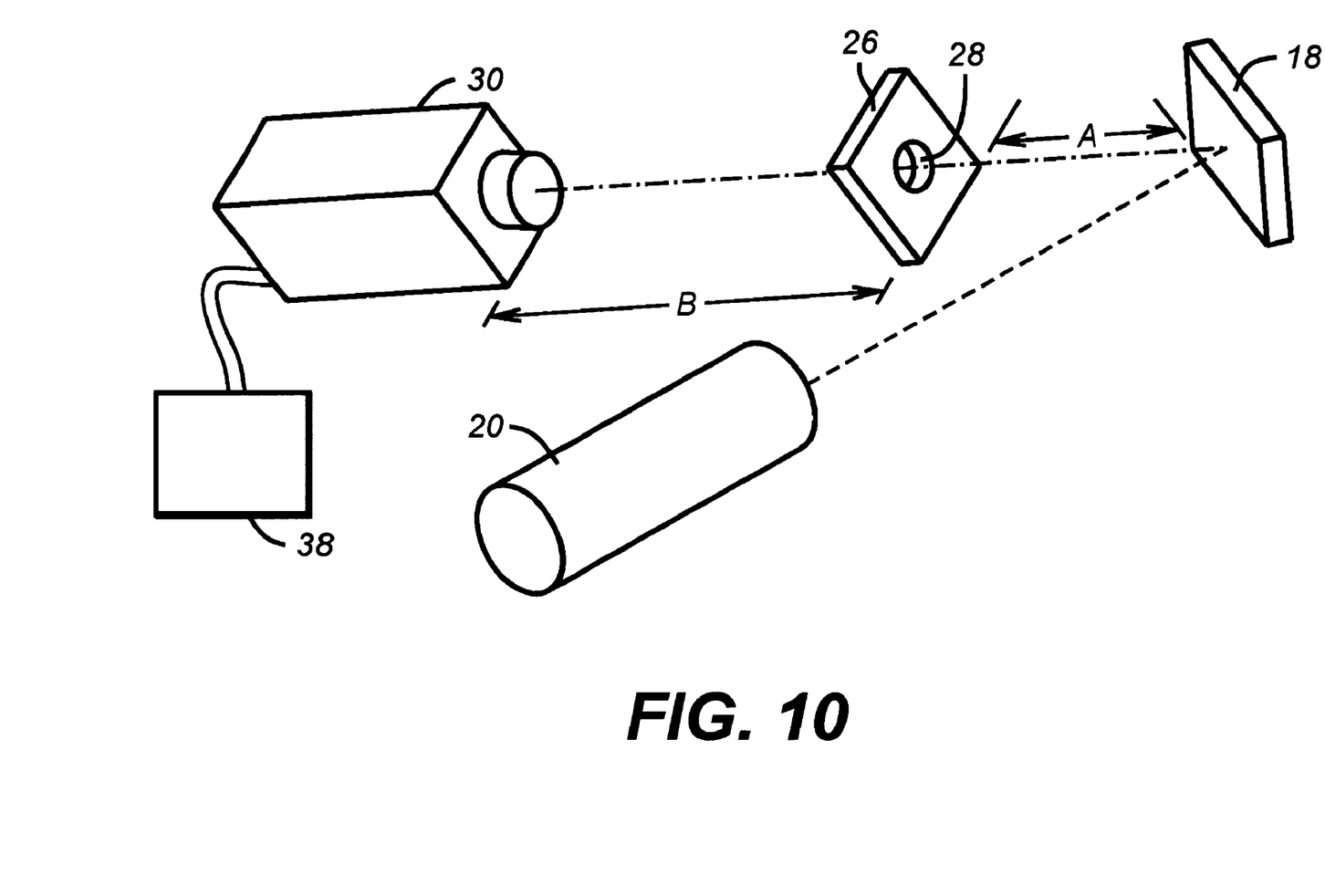
FIG. 10 is an isometric view of a sixth embodiment of the present invention.

Referring now to FIG. 10, in a further alternative embodiment, distance may be determined by measuring intensity at a plurality of points disposed about center of a diffraction pattern at screen 26.

As used herein, light source 20 in the preferred embodiment is a source of electromagnetic energy of a predetermined single wavelength or known wavelength distribution such as a laser light source, but can be any electromagnetic radiation source 20 aimed at a target, by way of example and not limitation including tunable light sources, pulsed sources, microwave emitters, radio wave emitters, ultraviolet radiation emitters, x-ray emitters, or noncoherent electromagnetic radiation emitters. Light source 20 illuminates target 18 without a need for an intermediate lens such as lens 42 in FIG. 5.

Screen 26 is disposed intermediate target 18 and detector 30 and is at least partially opaque at a predetermined wavelength $\lambda$ of the measured energy. At least one distance A or B will be a known value where A is the distance between target 18 and screen 26 and B is the distance between detector 30 and screen 26. Screen 26 comprises a substantially circular aperture 28 of a predetermined radius. Aperture 28 need not be in the center of screen 26.

Energy is at least partially reflected off of target 18 and incident upon screen 26. The resulting intensity is observed at detector 30 which is sensitive to and capable of measuring electromagnetic radiation of wavelength $\lambda$. A straight line between target 18 and detector 30 may not pass through aperture 28, but at least some detectable energy at wavelength $\lambda$ must be present at and near aperture 28 in order for sufficient energy to be present at detector 30.

In this configuration, a unique pattern is generated by the incident energy emitted by light source 20 that reflects off target 18 onto screen 26. This pattern is uniquely characteristic of the combination of the various distances in the configuration including the wavelength $\lambda$, size of aperture 28 and the distances between screen 26, detector 30, and target 18. The alternative configuration of FIG. 10 does not rely solely on intensity measured at a middle point of the defraction pattern on detector 30 but instead exploits the variations in amplitude of energy incident in the defraction pattern as determined by detector 30. As with other configurations described herein, processor 38 is coupled to receive signals indicative of measured intensity from detector 30. Processor 38 comprises at least one algorithm from which distances can be calculated. However, this embodiment presents a different computational burden than other methods described herein.

Figure 3:
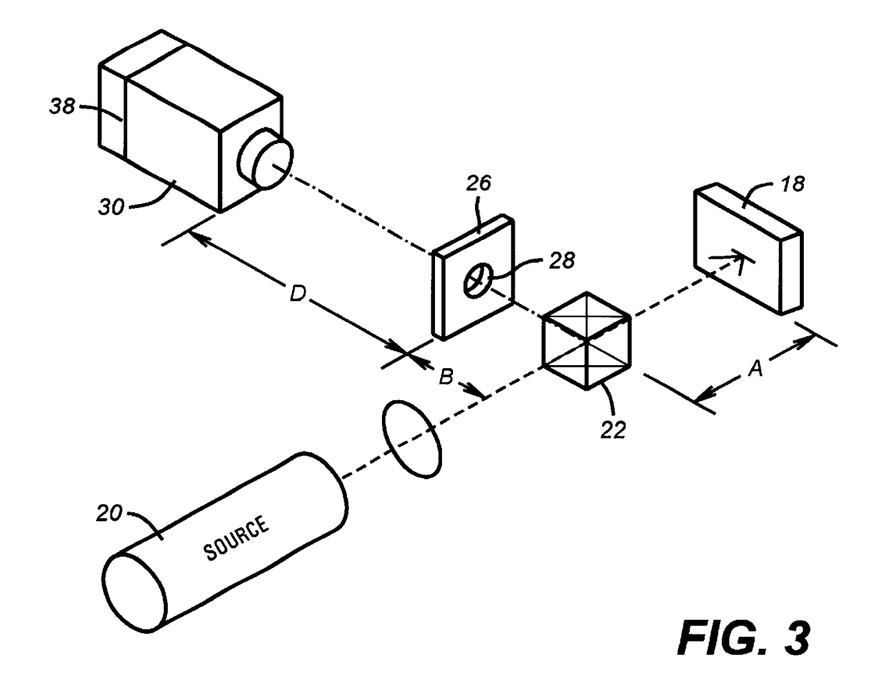
FIG. 3 is an isometric view of a third embodiment of the present invention.

Another embodiment of the present invention is depicted in FIG. 3. This embodiment comprises an electromagnetic radiation source 20 aimed at a target. In one preferred embodiment, the electromagnetic radiation source is a tunable light source. In another embodiment, the electromagnetic radiation source is a pulsed source. In another preferred embodiment, the electromagnetic radiation source emits microwaves, radio waves, ultraviolet radiation, x-rays, or noncoherent electromagnetic radiation. The source is capable of emitting a beam of electromagnetic energy having a known wavelength.

A beamsplitter is positioned between the source and the target at a distance, A, from the target. The beamsplitter comprises a first side facing the source, a second side facing the target, and a third side facing away from the target.

In a preferred embodiment, a lens 40 is positioned between the source and the beamsplitter. A screen comprising an aperture having known dimensions, a back side and a front side facing the third side of the beamsplitter, is positioned at a known distance, B, from the beamsplitter.

A detector is positioned a known distance, B, from the screen, on the back side of the screen, so as to receive a beam of electromagnetic radiation emitted from the source, and to measure the central intensity, CI, of the beam. A processor 38 is coupled to receive signals indicative of measured intensity from the detector. The processor comprises algorithms from which distances can be calculated.

Figure 4:
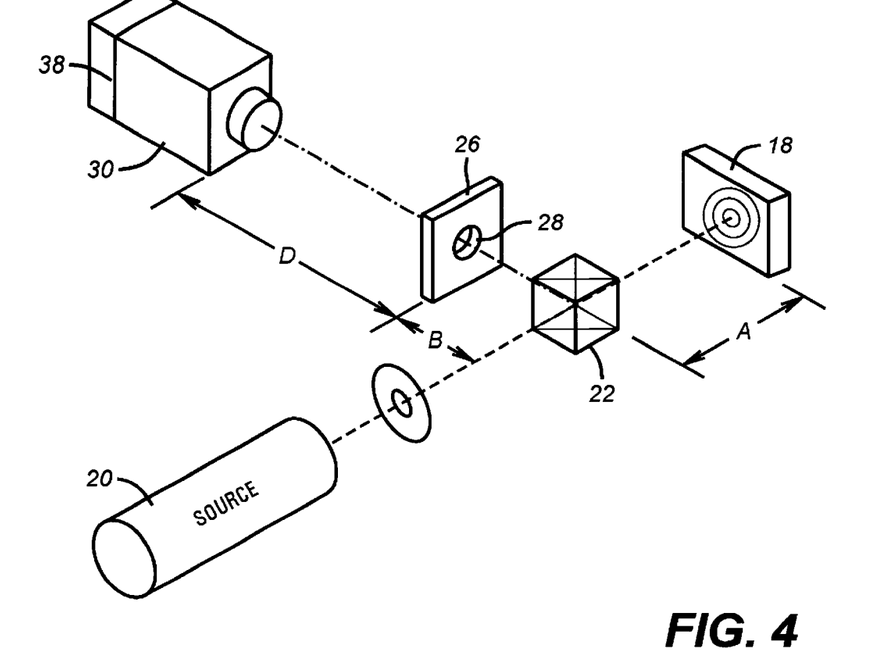
FIG. 4 is an isometric view of a fourth embodiment of the present invention.

Another embodiment to the present invention comprises a system for making distance measurements between a point and a detector, as shown in FIG. 4. This embodiment comprises an electromagnetic radiation source aimed at a target comprising a rough surface. The source is capable of emitting a beam of electromagnetic energy having a known wavelength.

A beamsplitter is positioned between the source and the target at a distance, A, from the target. The beamsplitter comprises a first side facing the source, a second source facing the target, and a third side facing away from the source and the target.

A first screen 42 comprising a first aperture 44 is positioned between the beamsplitter and the source. A second screen 26 comprising a second aperture 28, a back side and a front side, facing the third side of the beamsplitter is positioned at a distance, B, from the beamsplitter. A detector is positioned to receive light passing through the second aperture. The detector faces the back side of the second screen. In a preferred embodiment, the detector is a CCD camera. In another preferred embodiment, the detector comprises a variable size opening. When the opening is adjusted to a larger size setting, it allows the detector to detect light from a large diffraction pattern as needed to calculate $I_0$ in Equation 1. When the lens opening is set to a smaller setting, it allows the detector to detect only the central intensity, CI.

A processor is coupled to receive signals indicative of measured intensity from the detector. The processor comprises algorithms from which distances can be calculated.

Figure 5:
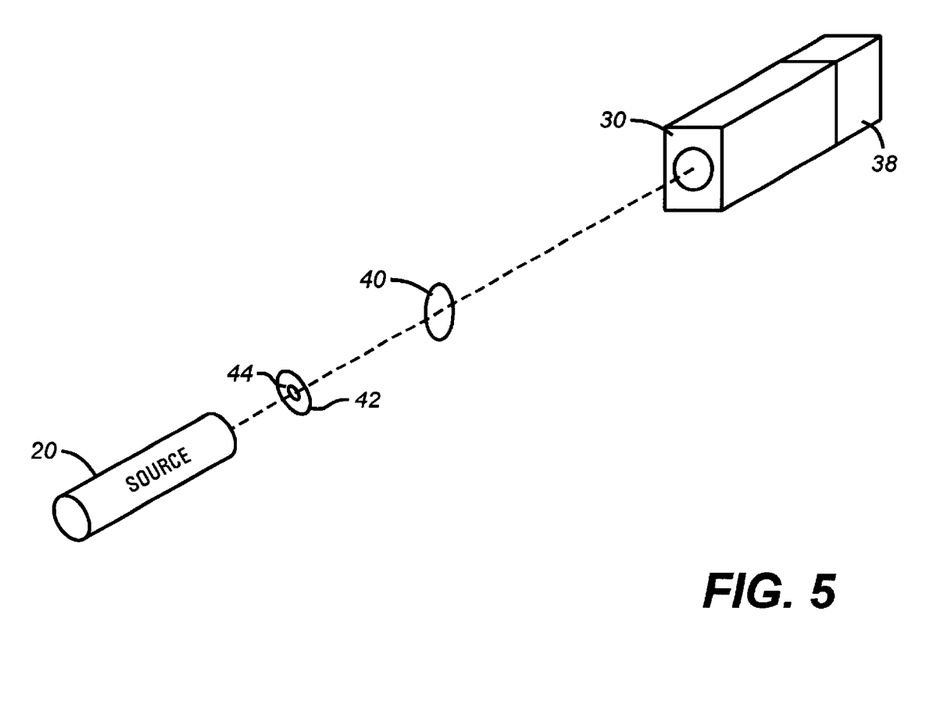
FIG. 5 is an isometric view of a fifth embodiment of the present invention.

Another embodiment of the present invention is depicted in FIG. 5. This embodiment is a system for making distance measurements between a point and a detector. This embodiment of the invention comprises an electromagnetic radiation source aimed at a target. The source is capable of emitting a beam of electromagnetic energy having a known wavelength. A detector is positioned to receive a beam from the source.

A first screen 42 comprising an aperture 44 is positioned between the detector and the source such that the projection of a beam from the source through the aperture produces a diffraction pattern.

A lens 40 is positioned between the first screen and the detector. The lens is positioned so as to compress or stretch the intensity variation as a function of distance from the pinhole to the source resulting from the projection of the beam through the aperture.

Figure 6:
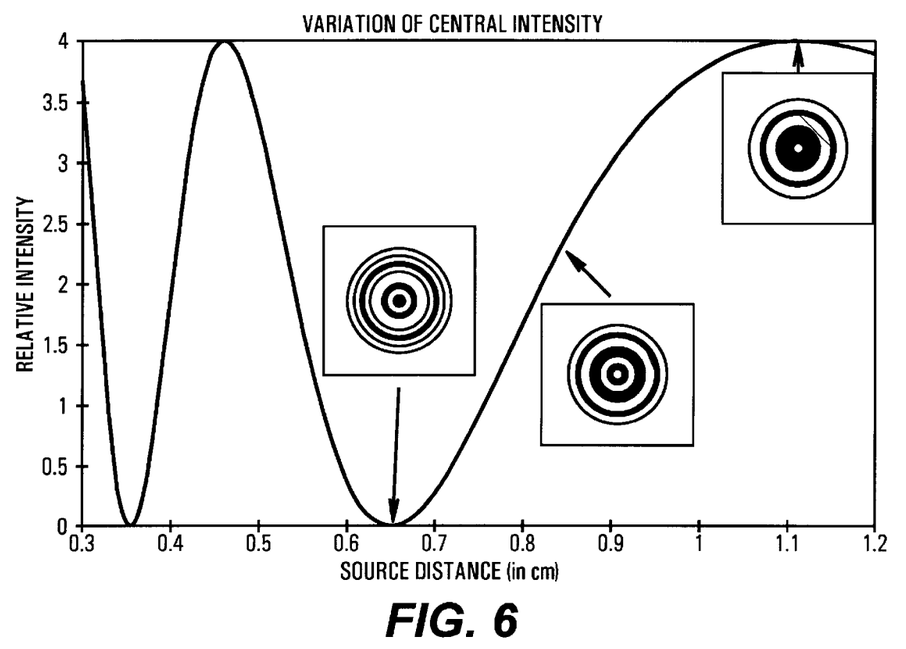
FIG. 6 is a graph of central intensity versus source distance.

FIG. 6 depicts a typical graph of central intensity versus source distance. As shown in FIG. 6, the intensity plotted as a function of source distance is a wavelike function. The compression or stretching of the diffraction pattern that is accomplished through the use of a lens refers to a stretching or compression of the lengths of cycles of the sinusoid depicted in FIG. 6. Where the focal length of the lens is less than the distance from the pinhole to the lens a compression results. Where the focal length of the lens is greater than the distance from the pinhole to the lens, a stretching results.

The invention further comprises a processor coupled to receive signals indicative of measured beam intensity from the detector. The processor comprised algorithms from which distances can be calculated.

Figure 7:
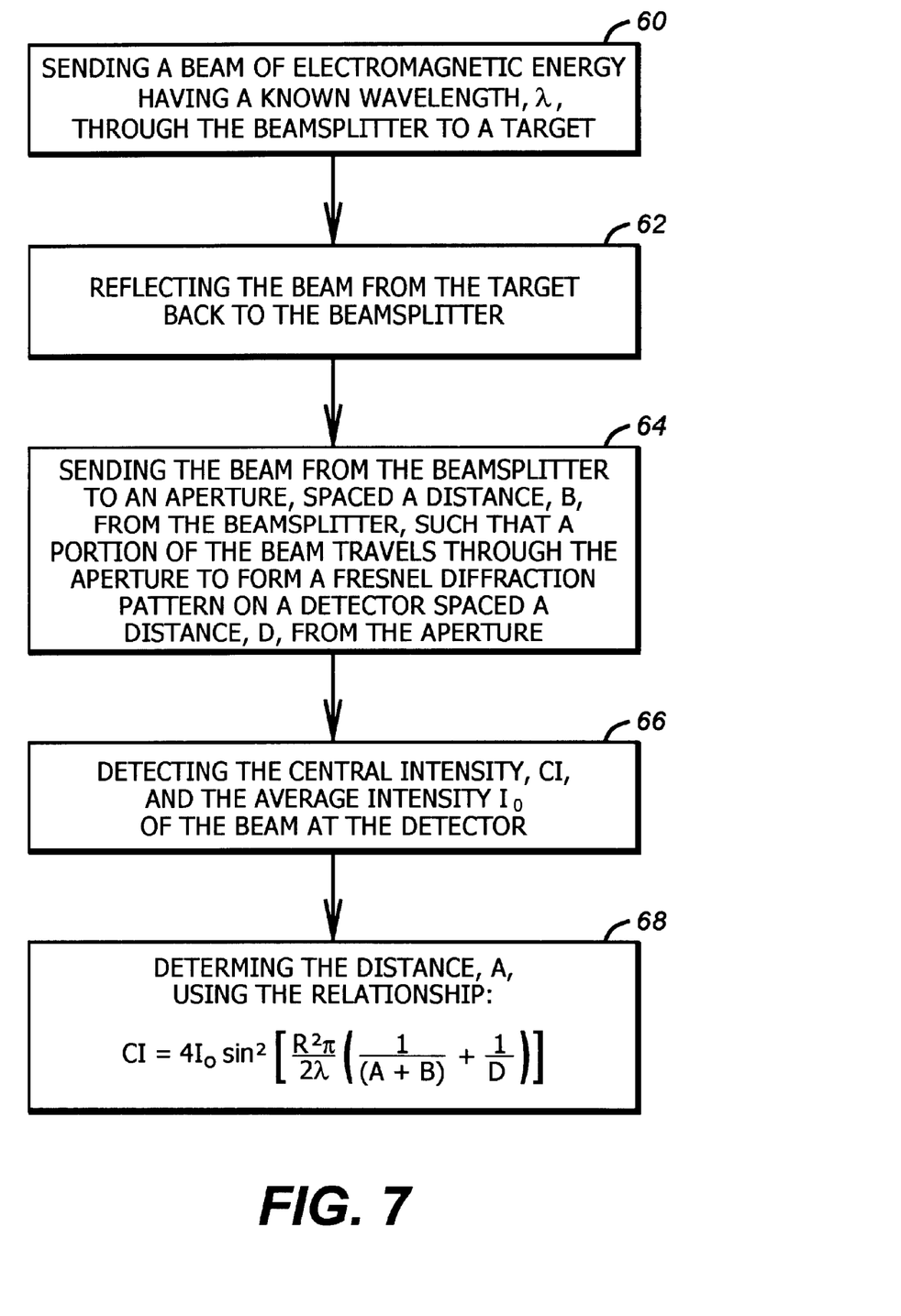
FIG. 7 is a block diagram of a first method embodiment of the present invention.

The present invention also comprises methods for measuring absolute distance. A first method embodiment of the present invention is shown in FIG. 7. This method comprises sending a beam of electromagnetic energy having a known wavelength, $\tilde{o}$, through a beamsplitter to a target as shown in block 60 of FIG. 7. The beam is then reflected from the target back to the beamsplitter as shown in block 62 of FIG. 7. The beam is sent from the beamsplitter to an aperture, spaced a distance, B, from the beamsplitter, such that a portion of the beam travels through the aperture to form a Fresnel diffraction patter on a detector space a distance, D, from the aperture, as shown in block 64 of FIG. 7.

The method further comprises detecting the central intensity, CI, and the average intensity, $I_0$, of the beam at the detector, as shown in block 66 of FIG. 7. The absolute distance, A, between the beamsplitter and the target is then determined using the relationship shown in Equation 1, as shown in block 68 of FIG. 7.

Figure 8:
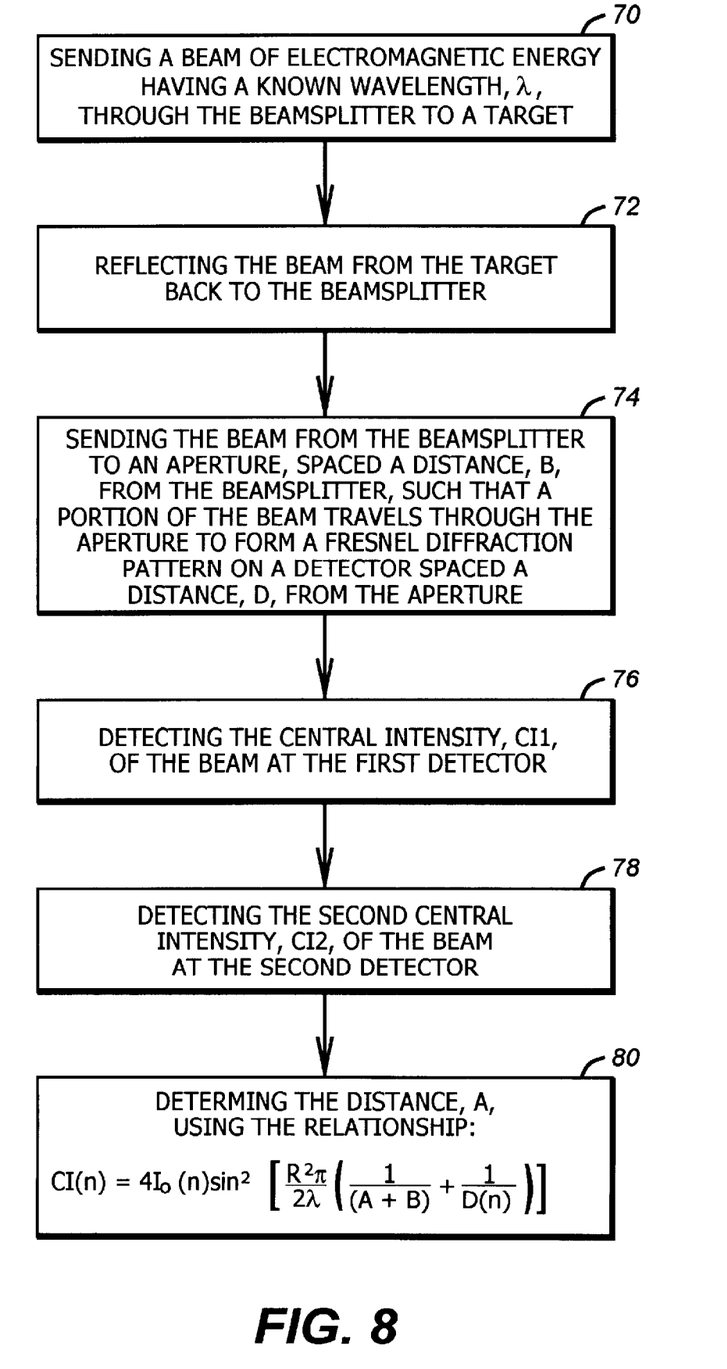
FIG. 8 is a block diagram of a second method embodiment of the present invention.

A second method embodiment of the present method invention is shown in FIG. 8. This method comprises sending a beam of electromagnetic energy having a known wavelength, $\tilde{o}$, through the beamsplitter to a target, as shown in block 70 of FIG. 8. The beam is then reflected from the target back to the beamsplitter, as shown in block 72 of FIG. 8. The beam is sent from the beamsplitter to an aperture, spaced a distance, B, from the beamsplitter, such that a first portion of the beam travels through the aperture to a first Fresnel diffraction pattern on a first detector space a distance, D1, from the aperture and a second portion of the beam travels through the aperture to form a second Fresnel diffraction pattern on a second detector spaced a distance, D2, from the aperture, as shown in block 74 of FIG. 8.

The method further comprises detecting a first central intensity, CI1, of the beam at the first detector, as shown in block 76 of FIG. 8. A second central intensity, CI2, of the beam is detected at the second detector, as shown in block 78 of FIG. 8. The absolute distance, A, between the beamsplitter and the target is then determined using the relationship shown in Equation 2, as shown in block 80 of FIG. 8.

Referring back to FIG. 10, intensity at wavelength $\lambda$ at a predetermined set of points at detector 30 are obtained. This set of obtained intensities may be taken at an increasing distance from a point near to or at the center of the pattern on detector 30 outward until intensity at wavelength $\lambda$ is at or below a predetermined threshold or another predetermined termination condition is reached. The set of obtained intensities is then used to characterize the spatial variation at detector 30 of intensity of energy at wavelength $\lambda$, thus producing a description of the diffraction pattern as function of distance from the center of the pattern.

Since a plurality of points is used and since the central intensity of energy at wavelength $\lambda$ at aperture 28 is not the determinant as with other embodiments herein, a different equation must be used to determine distance.

Figure 11:
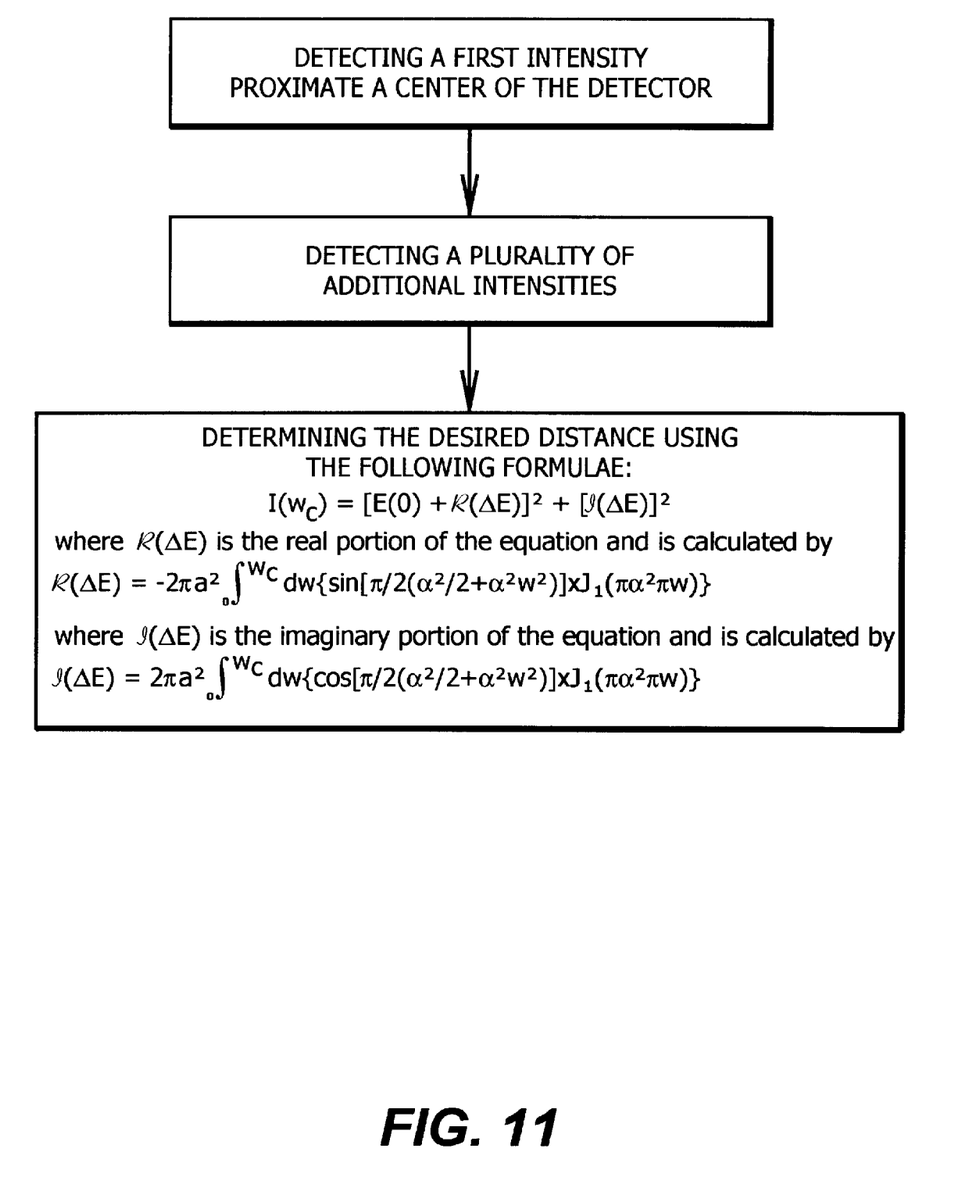
FIG. 11 is a block diagram of a third method embodiment of the present invention.

Referring now to FIG. 11, central intensity E(0) is measured at a predetermined distance from a center of a pattern. As opposed to use of a Fraunhofer approach, which considers an observation point that moves, this alternative approach considers aperture 28 as moving.

Thus, to measure a given distance, a beam of electromagnetic energy having a known wavelength $\lambda$ is incident on target 18 and a portion of that energy is reflected off target 18, passing through screen 26 to detector 30. The distance between detector 30 and target 18 may then be determined by determining central intensity E(0) by the following formula:

$$E(0)=4\pi(R_0/k)\exp[ika^2/4R_0]\times\sin[ka^2/(4R_0)]$$

Further, intensity at any point in the pattern is given by the formula:

$$I(w_c)=[E(0)+R(\Delta E)]^2+[J(\Delta E)]^2$$

where $R(\Delta E)$ is the real portion of the equation and is calculated by $$R(\Delta E)=-2\pi a^2{}_0\int^{w_c}dw\{\sin[\pi/2(\alpha^2/2+\alpha^2w^2)]\times J_1(\pi\alpha^2\pi w)\}$$

and $J(\Delta E)$ is the imaginary portion of the equation and is calculated by $$J(\Delta E)=2\pi a^2{}_0\int^{w_c}dw\{\cos[\pi/2(\alpha^2/2+\alpha^2w^2)]\times J_1(\pi\alpha^2\pi w)\}.$$

For these equations, $=^2=2a^2/\lambda R_0$ and $w=z/a$. In these equations, as will be understood by those of ordinary skill in the optic arts, "a" is the radius of aperture 28, "$J_1$" is the Bessel function of first degree, "$\lambda$" is the wavelength of the energy emitted from light source 20, and "z" is a Cartesian coordinate on a z axis passing through aperture 28 coplanar with screen 26. Once the intensity $I(w_c)$ is determined, the distance between target 18 and detector 30 may be determined by solving for the distance $R_0$. Since $(1/R_0)$ equals $(1/A)+(1/B)$ where A is a distance between target 18 and screen 26 and B is a distance between detector 30 and screen 26, if either A or B is known, $R_0$ allows solving for the remaining unknown distance.

Iterations of values of the unknown distance may continue until differences between successive iterations approach a predetermined limit.

The foregoing disclosure and description of the invention are illustrative and explanatory. Various changes in the size, shape, and materials, as well as in the details of the illustrative construction may be made without departing from the spirit of the invention.

What is claimed is:

1. A system for making distance measurements between a point and a detector, comprising:
   a) an electromagnetic radiation source aimed at a target, the source being capable of emitting a beam of electromagnetic energy having a known wavelength, the target being capable of at least partial reflection of the electromagnetic radiation;
   b) a detector positioned to receive the beam reflected from the target;
   c) a screen comprising an aperture having a predetermined radius, the aperture positioned between the detector and the target such that reflection of the beam from the target through the screen produces a Fresnel diffraction pattern; and
   d) a processor coupled to receive signals indicative of measured intensity from the detector, the processor comprising algorithms from which distances can be calculated.

2. The system of claim 1 wherein the electromagnetic radiation source is a laser.

3. A method for determining an absolute distance between a detector of electromagnetic radiation energy and a target, for a system further comprising a source of electromagnetic radiation energy and a screen, having an aperture therethrough, disposed intermediate the detector and the target, the method comprising:
   a) emitting a beam of electromagnetic radiation energy having a predetermined wavelength $\lambda$ from the source of electromagnetic radiation energy towards the target;
   b) reflecting at least a portion of the beam off the target through the screen located a distance A from the target such that a portion of the reflected beam travels through the aperture to form a Fresnel diffraction pattern on the detector spaced a distance B from the aperture;
   c) detecting a first intensity, E(0), of the reflected beam proximate a center of the screen at the detector;
   d) detecting a plurality of intensities at points on the screen other at where the first intensity is obtained;
   e) determining a distance between the target and the detector using an equation $$I(w_c)=E(0)+R(\Delta E)]^2+J(\Delta E)]^2;$$

wherein $I(w_c)$ is an intensity at a given point in the pattern such that the real and imaginary portions of the equation are determined using the formulas $$R(\Delta E)=-2\pi A^2{}_0\int^{w_c}dw\{\sin[\pi/2(\alpha^2/2+\alpha^2w^2)]\times J_1(\pi\alpha^2\pi w)\}$$

and $$J(\Delta E)=2\pi A^2{}_0\int^{w_c}dw\{\cos[\pi/2(\alpha^2/2+\alpha^2w^2)]\times J_1(\pi\alpha^2\pi w)\},$$

for $\alpha^2=2A^2/\lambda R_0$ where A is equal to a radius of the aperture and z is equal to a point on a Cartesian z axis passing through the center of the aperture;
   whereby $(1/R_0)=(1/A)+(1/B)$ and either A or B are known.

4. The method of 3 wherein $I(w_c)$ is determined iteratively.

5. The method of 4 wherein the iterations continue until a difference between successive iterations is at least equal to a predetermined amount.

* * * * *